United States Patent Office
3,218,244
Patented Nov. 16, 1965

3,218,244
NICKEL ELECTROPLATING BATH CONTAINING A 1,2-DICHLOROPROPENE PYRIDINIUM OR QUINOLINIUM BRIGHTENER
Frank Passal, Detroit, Arthur J. Tomson, Novi, and Warren R. Doty, Clawson, Mich., assignors to M & T Chemicals Inc., New York, N.Y., a corporation of Delaware
No Drawing. Filed Feb. 1, 1963, Ser. No. 255,692
18 Claims. (Cl. 204—49)

The present invention relates to novel compositions of matter and to improved nickel electroplating baths and processes.

It is an object of this invention to provide novel compositions of matter. Another object of this invention is to provide a process for producing novel compositions of matter. Still another object of this invention is to provide superior baths for electrodepositing bright and smooth nickel. Another object of this invention is to provide superior processes for electrodepositing bright and smooth nickel. Other objects will be apparent to those skilled in the art on inspection of the following description.

The novel products of this invention according to certain of its aspects comprise 1,2-dichloropropene pyridinium salts which may have the general formula

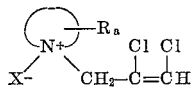

wherein

may be pyridine or quinoline; X may be a bath-soluble, bath-compatible anion; R may be selected from the group consisting of alkyl radicals having 1–4 carbon atoms, halide, and hydroxyalkyl radicals having 1–4 carbon atoms; and $a$ is 0–3. When $a$ is more than 1, the several R groups may be the same or different. R may preferably be methyl. For convenience, these salts which may be salts of pyridine bases or quinoline bases may be referred to herein as "pyridinium salts." The quinolinium salts are considered a species of the substituted pyridinium salts.

The novel salts of this invention may be prepared by reacting the quinoline or pyridine base compound with 1,2,3-trichloropropene. Typical preferred pyridine base compounds wherein R is alkyl which may be employed may include pyridine se; 1-methyl pyridine; 2-methyl pyridine; 3-methyl pyridine; 1-ethyl pyridine; 2-n-butyl pyridine; 3,5-dimethyl pyridine; 3,4-dimethyl pyridine. A typical preferred compound wherein the heterocyclic ring is quinoline may be 2-methyl quinoline (i.e. quinaldine). The preferred compounds may be pyridine se, and 3,4-dimethyl pyridine.

Typically the preferred 1,2,3-trichloropropene may be the commercially available mixture containing about equal parts of the optical isomers. Reaction may be effected by mixing together the pyridine or quinoline base compound and the trichloro compound. The reaction may be preferably carried out in the presence of an inert diluent or solvent, typically dimethylformamide. The reaction mixture including e.g. pyridine base compound and preferably inert diluent may be cooled to 10° C. to —10° C., and the reaction mixture may be maintained at this temperature for 48–240 hours. Preferably however the reaction may be carried out at ambient temperature of e.g. 20° C.–30° C. The reaction mixture is preferably maintained at room temperature for several days during which the pyridinium salt may precipitate as a crystalline material. The product salt may precipitate as well-defined crystals which may be separated from the reaction mixture, as by filtration, and then washed. Washing may be preferably effected with the solvent or diluent, e.g. dimethylformamide, in a first step and followed by a second washing with acetone. The product quaternary pyridinium salt may be preferably dried under vacuum. These salts may be highly water soluble.

The pyridinium chloride salt may be prepared directly from the 1,2,3-trichloropropene. The chloride anion formed on dissolving the quaternary chloride salt in aqueous solution may be replaced by other soluble, bath-compatible anions. A soluble, bath-compatible anion may be an anion which in combination with the noted compound renders the latter soluble in aqueous nickel electroplating baths in amount sufficient to give a primary brightening effect; and which is compatible with the compounds of the bath i.e. which does not interfere with satisfactory operation of the bath. Typical anions may include acetate, sulfate, methosulfate, ethosulfate, citrate, and chloroacetate. Preferred anions may include halide, i.e. fluoride, chloride, and iodide, and perchlorate. These other anions may be introduced by the replacement of the chloride anion by e.g. the acetate anion by reacting the chloride quaternary with e.g. silver acetate. Iodide may be substituted for the chloride by reacting the pyridinium chloride in aqueous solution with e.g. sodium iodide in ethanol, etc.

Illustrative of the preparation of the pyridinium salts are the following examples:

EXAMPLE 1

To a 5-liter reaction vessel equipped with a screw cap there may be added 3720 g. pyridine which may be then preferably chilled to —10° C. in an ice-salt bath. To the chilled contents, there may be added 5320 g. of 1,2,3-trichloropropene and 7210 g. of dimethylformamide solvent. The solution may be kept cold (—10° C. to +5° C.) for two days and then maintained at room temperature. After the third day crystallization may be observed at room temperature. The mixture may be then allowed to stand for 10 days at room temperature and filtered. The filter cake may be washed several times with dimethylformamide and finally with acetone. The residue, 6500 g. of 1,2-dichloropropene pyridinium chloride may be dried under vacuum in a desiccator to yield a product having a melting point of 200° C.–205° C.

EXAMPLE 2

The 1,2-dichloropropene pyridinium chloride product of Example 1 may be reacted with sodium iodide in ethanol at room temperature to prepare 1,2-dichloropropene pyridinium iodide (M.P. 167° C.) which may be crystallized from the solution.

EXAMPLE 3

Following the procedure of Example 1, but mixing and maintaining the reactants at room temperature, 1,2-dichloropropene 3,4-dimethylpyridinium chloride may be prepared utilizing 3,4-dimethylpyridine as reactant in place of pyridine.

EXAMPLE 4

Following the procedure of Example 2, 1,2-dichloropropene 3,4-dimethyl pyridinium iodide (M.P. 198° C.–200° C.) may be prepared from the product of Example 3.

EXAMPLE 5

Following the procedure of Example 1, 1,2-dichloropropene 4-methylpyridinium chloride may be prepared using 4-methylpyridine as reactant in place of pyridine.

EXAMPLE 6

Following the procedure of Example 2, 1,2-dichloropropene 4-methylpyridinium iodide (M.P. 195° C.–197° C.) may be prepared from the product of Example 5.

EXAMPLE 7

Following the procedure of Example 1, 1,2-dichloro propene 2-methylpyridinium chloride may be prepared using 2-methylpyridine as reactant in place of pyridine.

EXAMPLE 8

Following the procedure of Example 2, 1,2-dichloro propene 2-methylpyridinium iodide (M.P. 168° C.–170° C.) may be prepared from the product of Example 7.

EXAMPLE 9

Following the procedure of Example 1, 1,2-dichloro propene 3,5-dimethylpyridinium chloride may be prepared using 3,5-dimethylpyridine as reactant in place of pyridine.

EXAMPLE 10

Following the procedure of Example 2, 1,2-dichloro propene 3,5-dimethylpyridinium iodide (M.P. 157° C.–158° C.) may be prepared from the chloride product of Example 9.

EXAMPLE 11

Following the procedure of Example 1, 1,2-dichloro propene quinolinium chloride may be prepared using quinoline as reactant in place of pyridine.

EXAMPLE 12

Following the procedure of Example 1, 1,2-dichloro propene 2-methylquinolinium chloride may be prepared using 2-methylquinoline as reactant in place of pyridine.

In accordance with certain of its aspects, this invention may comprise the process for electrodepositing nickel from an aqueous nickel electroplating bath containing 1 g./l.–20 g./l. of a secondary brightener selected from the group consisting of saccharin, dibenzene sulfonamide, and sodium benzene monosulfonate, and 0.005 g./l.–0.1 g./l. of a primary brightener containing a cation having the structure

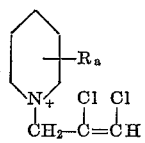

wherein $a$ is 0 to 3; and R is selected from the group consisting of alkyl radicals having 1 to 4 carbon atoms, halide, and hydroxyalkyl radicals having 1–4 carbon atoms.

The novel compounds when used as primary brighteners may be present preferably in amounts of about 0.005 g./l.–0.1 g./l., preferably 0.01 g./l.–0.05 g./l.

The basis metal on which the metal may be electro-deposited in accordance with this invention may preferably be copper or copper alloys; ferrous metals including sheet iron; or other metals including nickel, etc.

Addition agents as brighteners in bright nickel plating baths may be divided, broadly, into two classes on the basis of their function. Secondary brighteners (1) may increase the brightness of an ordinarily dull or matte deposit but not to a full or mirror bright stage and (2) may impart a ductilizing effect. The use of primary brighteners in conjunction wtih secondary brighteners may result in mirror bright deposits. It is preferred to use with the novel primary brighteners of this invention an auxiliary secondary brightener to provide superior deposit luster. These auxiliary secondary brighteners may preferably be unsaturated hydrocarbon sulfonates including sodium 2-propene-1 sulfonate; sodium 3-chloro-2-butene sulfonate; the mixed isomers of sodium 3-butene-2-hydroxy-1-sulfonate and sodium 3-butene-1-hydroxy-2-sulfonate; sodium 2-propyne-1-sulfonate; and sodium 1-phenyl-ethene-2-sulfonate.

The preferred pyridinium salts of the present invention are particularly potent and extremely effective primary brighteners. The particular preferred concentration of the pyridinium salt used in a given bath may depend on the secondary brightener used, the auxiliary secondary brightener, and such other factors as the degree of luster, and rate of brightening and leveling desired, and the finish of the basis metal.

The preferred secondary brighteners may be generally characterized by the presence of at least one sulfone or sulfonic acid group attached to a nuclear carbon of an aromatic hydrocarbon ring e.g. benzene, naphthalene, etc. They may be used in amounts of 1 g./l.–75 g./l., and preferably 1 g./l.–20 g./l. The preferred secondary brighteners, which may contain a sulfonate or sulfone bonded to an aromatic structure, may include saccharin, dibenzenesulfonamide, and sodium benzene monosulfonate.

The primary brighteners of the present invention may be useful with e.g. Watts Type Baths and High Chloride Type Baths, including those typified by the illustrative baths of Tables I and II.

Table I

WATTS-TYPE BATHS

| | | |
|---|---|---|
| Nickel sulfate | g./l. | 200 to 400 |
| Nickel chloride | g./l. | 30 to 75 |
| Boric acid | g./l. | 30 to 50 |
| Temperature | ° C. | 30 to 65 |
| pH | | [1] 3.5 to 5.0 |

[1] Electrometric.

with agitation (either mechanical, air, or solution circulation by pumping).

Table II

HIGH CHLORIDE BATHS

| | | |
|---|---|---|
| Nickel chloride | g./l. | 150 to 300 |
| Nickel sulfate | g./l. | 40 to 150 |
| Boric acid | g./l. | 30 to 50 |
| Temperature | ° C. | 30 to 65 |
| pH | | [1] 3.5 to 5.0 |

[1] Electrometric.

with agitation (either mechanical, air, or solution circulation by pumping).

The plating conditions for electrodeposition from the aforementioned baths may for example include temperature of 40° C.–70° C., pH of 3.5–5 electrometric, and preferably 3.8–4.5, cathode current density of 1–10 amps. per sq. dm. Typical preferred current density of the baths of Table I may be 4–6 amps. per sq. dm. and for the baths of Table II 5–10 amps. per sq. dm. Agitation may be preferred while plating.

For the purpose of giving those skilled in the art a better understanding of the invention, the following illustrative examples are given.

In Examples 13–33, a Watts-Type Bath having 300 g./l. of nickel sulfate, 60 g./l. of nickel chloride, and 45 g./l. of boric acid was used. In the remaining examples, a high chloride bath having 45 gl./l. of nickel sulfate, 250 g./l. of nickel chloride and 45 gl./l. of boric acid was used. In Examples 13–19, 21–22, and 26–41, sodium dihexylsulfosuccinate was used as the wetting agent in an amount of 0.1 g./l., with air agitation; in the remaining examples, 0.25 g./l. of sodium lauryl sulfate were used, with mechanical agitation. Brilliant, mirror bright, highly leveled electrodeposits were obtained in all the tests.

In Examples 13-41, the primary brighteners are identified in accordance with the following code:

Primary brightener: Compound
- A ____ 1,2-dichloropropene pyridinium chloride.
- B ____ 1,2-dichloropropene pyridinium iodide.
- C ____ 1,2-dichloropropene 3,4-dimethylpyridinium iodide.
- D ____ 1,2-dichloropropene 4-methylpyridinium iodide.
- E ____ 1,2-dichloropropene 2-methylpyridinium iodide.
- F ____ 1,2-dichloropropene 3,5-dimethylpyridinium iodide.

| Ex. No. | Additives | Amt., g./l. | c.d., a./dm.² | pH electrometric | Temp., °C. |
|---|---|---|---|---|---|
| 13 | Primary Brightener A | 0.02 | 4.0 | 4.0 | 55 |
|  | Saccharin | 2 | | | |
|  | Sodium 2-propene-1 sulfonate. | 2 | | | |
| 14 | Primary Brightener B | 0.02 | 4.0 | 4.0 | 55 |
|  | Saccharin | 2 | | | |
|  | Sodium 3-chloro-2-butene sulfonate. | 3 | | | |
| 15 | Primary Brightener C | 0.03 | 4.0 | 4.0 | 55 |
|  | Saccharin | 2 | | | |
|  | Sodium 3-chloro-2-butene sulfonate. | 3 | | | |
| 16 | Primary Brightener D | 0.03 | 4.0 | 4.0 | 55 |
|  | Saccharin | 2 | | | |
|  | Sodium 3-chloro-2-butene sulfonate. | 3 | | | |
| 17 | Primary Brightener E | 0.03 | 4.0 | 4.0 | 55 |
|  | Saccharin | 2 | | | |
|  | Sodium 2-chloro-2-butene sulfonate. | 3 | | | |
| 18 | Primary Brightener F | 0.03 | 4.0 | 4.0 | 55 |
|  | Saccharin | 2 | | | |
|  | Sodium 3-chloro-2-butene sulfonate. | 3 | | | |
| 19 | Primary Brightener A | 0.02 | 5.0 | 3.5 | 60 |
|  | Dibenzenesulfonamide | 2 | | | |
|  | Sodium 3-chloro-2-butene sulfonate. | 3 | | | |
| 20 | Primary Brightener A | 0.02 | 5.0 | 4.2 | 60 |
|  | Saccharin | 2 | | | |
|  | Mixed isomer of sodium 3-butene-2-hydroxy-1-sulfonate and sodium 3-butene-1-hydroxy-2-sulfonate. | 4 | | | |
| 21 | Primary Brightener A | 0.02 | 5.0 | 4.0 | 60 |
|  | Saccharin | 2 | | | |
|  | Sodium 2-propyne-1 sulfonate. | 2 | | | |
| 22 | Primary Brightener B | 0.02 | 4.0 | 4.0 | 60 |
|  | Sodium benzene monosulfonate. | 4 | | | |
|  | Sodium 3-chloro-2-butene-1 sulfonate. | 4 | | | |
| 23 | Primary Brightener B | 0.02 | 4.0 | 3.8 | 55 |
|  | Dibenzenesulfonamide | 2 | | | |
|  | Sodium 2-propene-1 sulfonate. | 2 | | | |
| 24 | Primary Brightener C | 0.05 | 4.0 | 4.0 | 55 |
|  | Saccharin | 2 | | | |
|  | Sodium 3-chloro-2-butene-1 sulfonate. | 3 | | | |
| 25 | Primary Brightener D | 0.05 | 4.0 | 3.5 | 60 |
|  | Sodium benzene monosulfonate. | 4 | | | |
|  | Sodium 2-propene-1 sulfonate. | 2 | | | |
| 26 | Primary Brightener E | 0.05 | 6.0 | 4.0 | 65 |
|  | Saccharin | 2 | | | |
|  | Sodium 3-chloro-2-butene-1 sulfonate. | 4 | | | |
| 27 | Primary Brightener F | 0.05 | 4.0 | 4.5 | 50 |
|  | Sodium benzene monosulfonate. | 4 | | | |
|  | Sodium 2-propene-1-sulfonate. | 2 | | | |
| 28 | Primary Brightener A | 0.02 | 0.4 | 4.0 | 55 |
|  | Saccharin | 2 | | | |
|  | Sodium 1-phenylethene-2-sulfonate. | 2 | | | |
| 29 | Primary Brightener A | 0.04 | 4.0 | 4.0 | 55 |
|  | Sodium benzene monosulfonate. | 4 | | | |
|  | Sodium 1-phenylethene-2-sulfonate. | 2 | | | |
| 30 | Primary Brightener A | 0.04 | 4.0 | 4.0 | 55 |
|  | Dibenzene sulfonamide | 2 | | | |
|  | Sodium 1-phenylethene-2-sulfonate. | 2 | | | |
| 31 | Primary Brightener C | 0.02 | 4.0 | 4.0 | 55 |
|  | Saccharin | 2 | | | |
|  | Sodium 1-phenylethene-2-sulfonate. | 2 | | | |
| 32 | Primary Brightener C | 0.04 | 4.0 | 4.0 | 55 |
|  | Sodium benzene monosulfonate. | 4 | | | |
|  | Sodium 1-phenylethene-2-sulfonate. | 2 | | | |
| 33 | Primary Brightener C | 0.04 | 4.0 | 4.0 | 55 |
|  | Dibenzene sulfonamide | 2 | | | |
|  | Sodium 1-phenylethene-2-sulfonate. | 2 | | | |
| 34 | Primary Brightener A | 0.02 | 5.0 | 4.0 | 55 |
|  | Sodium benzene monosulfonate. | 4 | | | |
|  | Mixed isomer of sodium 3-butene-2-hydroxy-1-sulfonate and sodium 3-butene-1-hydroxy-2-sulfonate. | 4 | | | |
| 35 | Primary Brightener A | 0.02 | 5.0 | 4.0 | 55 |
|  | Sodium benzene monosulfonate. | 4 | | | |
|  | Sodium 2-propyne-1 sulfonate. | 2 | | | |
| 36 | Primary Brightener A | 0.02 | 4.0 | 4.0 | 55 |
|  | Saccharin | 2 | | | |
|  | Sodium 3-chloro-2-butene-1 sulfonate. | 3 | | | |
| 37 | Primary Brightener B | 0.03 | 4.0 | 4.0 | 55 |
|  | Saccharin | 2 | | | |
|  | Sodium 3-chloro-2-butene-1 sulfonate. | 3 | | | |
| 38 | Primary Brightener C | 0.05 | 4.0 | 4.0 | 55 |
|  | Saccharin | 2 | | | |
|  | Sodium 3-chloro-2-butene-1 sulfonate. | 3 | | | |
| 39 | Primary Brightener D | 0.05 | 4.0 | 4.0 | 55 |
|  | Saccharin | 2 | | | |
|  | Sodium 3-chloro-2-butene-1 sulfonate. | 3 | | | |
| 40 | Primary Brightener E | 0.05 | 4.0 | 4.0 | 55 |
|  | Saccharin | 2 | | | |
|  | Sodium 3-chloro-2-butene-1 sulfonate. | 3 | | | |
| 41 | Primary Brightener F | 0.05 | 4.0 | 4.0 | 55 |
|  | Saccharin | 2 | | | |
|  | Sodium 3-chloro-2-butene-1 sulfonate. | 3 | | | |

The foregoing examples illustrate specific baths and processes, which permit attainment of mirror bright, highly leveled nickel deposits.

The nickel electrodeposits obtained from baths utilizing the novel brightener combination are advantageous in that mirror bright lustrous electrodeposits having a high degree of ductility may be obtained over a wide range of current densities.

As many embodiments of this invention may be made without departing from the spirit and scope thereof, it is to be understood that the invention includes all such modifications and variations as come within the scope of the appended claims.

We claim:
1. An aqueous acid electrolytic bath containing soluble nickel salts for the electrodeposition of mirror bright nickel containing a secondary brightener and 0.005 g./l.–0.1 g./l. of a primary brightener, said primary brightener containing a cation having the structure

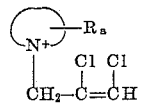

wherein $a$ is 0 to 3; R is selected from the group consisting of alkyl radicals having 1–4 carbon atoms, halide, and hydroxyalkyl radicals having 1–4 carbon atoms; and is selected from the group consisting of pyridine and quinoline.

2. An aqueous acid electrolytic bath containing soluble nickel salts for the electrodeposition of mirror bright nickel, containing a secondary brightener, an unsaturated hydrocarbon sulfonate auxiliary secondary brightener, and 0.005–0.1 g./l. of a primary brightener containing a cation having the structure

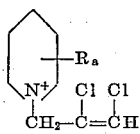

wherein $a$ is 0 to 3; and R is selected from the group consisting of alkyl radicals having 1–4 carbon atoms, halide, and hydroxyalkyl radicals having 1–4 carbon atoms.

3. The bath of claim 2 wherein the primary brightener is used in an amount of 0.01 g./l.–0.05 g./l.

4. The process for electroplating nickel which comprises electrodepositing nickel from an aqueous nickel electroplating bath containing 1 g./l.–20 g./l. of a secondary brightener selected from the group consisting of saccharin, dibenzenesulfonamide, and sodium benzene monosulfonate, and 0.005 g./l.–0.1 g./l. of a primary brightener containing a cation having the structure

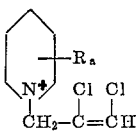

wherein $a$ is 0 to 3; and R is selected from the group consisting of alkyl radicals having 1–4 carbon atoms, halide, and hydroxyalkyl radicals having 1–4 carbon atoms.

5. The process of claim 4 wherein the primary brightener is present in a concentration of 0.01 g./l.–0.05 g./l., and in which the bath also contains an unsaturated hydrocarbon sulfonate as an auxiliary secondary brightener.

6. An aqueous acid electrolytic bath containing soluble nickel salts for the electrodeposition of mirror bright nickel containing a secondary brightener and 0.005 g./l.–0.1 g./l. of a primary brightener, said primary brightener containing the cation of 1,2-dichloropropene pyridinium salts.

7. An aqueous acid electrolytic bath containing soluble nickel salts for the electrodeposition of mirror bright nickel containing a secondary brightener and 0.005 g./l.–0.1 g./l. of a primary brightener, said primary brightener containing the cation of 1,2-dichloropropene 3,4-dimethylpyridinium salts.

8. An aqueous acid electrolytic bath containing soluble nickel salts for the electrodeposition of mirror bright nickel containing a secondary brightener and 0.005 g./l.–0.1 g./l. of a primary brightener, said primary brightener containing the cation of 1,2-dichloropropene 4-methylpyridinium salts.

9. An aqueous acid electrolytic bath containing soluble nickel salts for the electrodeposition of mirror bright nickel containing a secondary brightener and 0.005 g./l.–0.1 g./l. of a primary brightener, said primary brightener containing the cation of 1,2-dichloropropene 2-methylpyridinium salts.

10. An aqueous acid electrolytic bath containing soluble nickel salts for the electrodeposition of mirror bright nickel containing a secondary brightener and 0.005 g./l.–0.1 g./l. of a primary brightener, said primary brightener containing the cation of 1,2-dichloropropene 3,5-dimethylpyridinium salts.

11. An aqueous acid electrolytic bath containing soluble nickel salts for the electrodeposition of mirror bright nickel containing a secondary brightener and 0.005 g./l.–0.1 g./l. of a primary brightener, said primary brightener containing the cation of 1,2-dichloropropene 2-methylquinolinium salts.

12. The process for electroplating nickel which comprises electrodepositing nickel from an aqueous nickel electroplating bath containing 1 g./l.–20 g./l. of a secondary brightener selected from the group consisting of saccharin, dibenzenesulfonamide, and sodium benzene monosulfonate, and 0.005 g./l.–0.1 g./l. of a primary brightener containing a cation having the structure

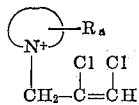

wherein $a$ is 0 to 3; R is selected from the group consisting of alkyl radicals having 1–4 carbon atoms, halide, and hydroxyalkyl radicals having 1–4 carbon atoms; and

is selected from the group consisting of pyridine and quinoline.

13. The process for electroplating nickel which comprises electrodepositing nickel from an aqueous nickel electroplating bath containing 1 g./l.–20 g./l. of a secondary brightener selected from the group consisting of saccharin, dibenzenesulfonamide, and sodium benzene monosulfonate, and 0.005 g./l.–0.1 g./l. of a primary brightener containing the cation of 1,2-dichloropropene pyridinium salts.

14. The process for electroplating nickel which comprises electrodepositing nickel from an aqueous nickel electroplating bath containing 1 g./l.–20 g./l. of a secondary brightener selected from the group consisting of saccharin, dibenzenesulfonamide, and sodium benzene monosulfonate and 0.005 g./l.–0.1 g./l. of a primary brightener containing the cation of 1,2-dichloropropene 3,4-dimethylpyridinium salts.

15. The process for electroplating nickel which comprises electrodepositing nickel from an aqueous nickel electroplating bath containing 1 g./l.–20 g./l. of a secondary brightener selected from the group consisting of saccharin, dibenzenesulfonamide, and sodium benzene monosulfonate, and 0.005 g./l.–0.1 g./l. of a primary brightener containing the cation of 1,2-dichloropropene 4-methylpyridinium salts.

16. The process for electroplating nickel which comprises electrodepositing nickel from an aqueous nickel electroplating bath containing 1 g./l.–20 g./l. of a secondary brightener selected from the group consisting of saccharin, dibenzenesulfonamide, and sodium benzene monosulfonate, and 0.005 g./l.–0.1 g./l. of a primary brightener containing the cation of 1,2-dichloropropene 2-methylpyridinium salts.

17. The process for electroplating nickel which comprises electrodepositing nickel from an aqueous nickel electroplating bath containing 1 g./l.–20 g./l. of a secondary brightener selected from the group consisting of saccharin, dibenzenesulfonamide, and sodium benzene monosulfonate, and 0.005 g./l.–0.1 g./l. of a primary brightener containing the cation of 1,2-dichloropropene 3,5-dimethylpyridinium salts.

18. The process for electroplating nickel which comprises electrodepositing nickel from an aqueous nickel electroplating bath containing 1 g./l–20 g./l. of a secondary brightener selected from the group consisting of saccharin, dibenzenesulfonamide, and sodium benzene monosulfonate, and 0.005 g./l.–0.1 g./l. of a primary brightener containing the cation of 1,2-dichloropropene 2-methylquinolinium salts.

References Cited by the Examiner

UNITED STATES PATENTS

| | | | |
|---|---|---|---|
| 2,749,349 | 6/1956 | Cislak | 260—290 |
| 2,938,033 | 5/1960 | Stehman | 260—290 |
| 2,986,500 | 5/1961 | Passal | 204—49 |
| 3,054,733 | 9/1962 | Heiling | 204—49 |

JOHN H. MACK, *Primary Examiner.*

MURRAY TILLMAN, *Examiner.*